United States Patent Office 3,511,646
Patented May 12, 1970

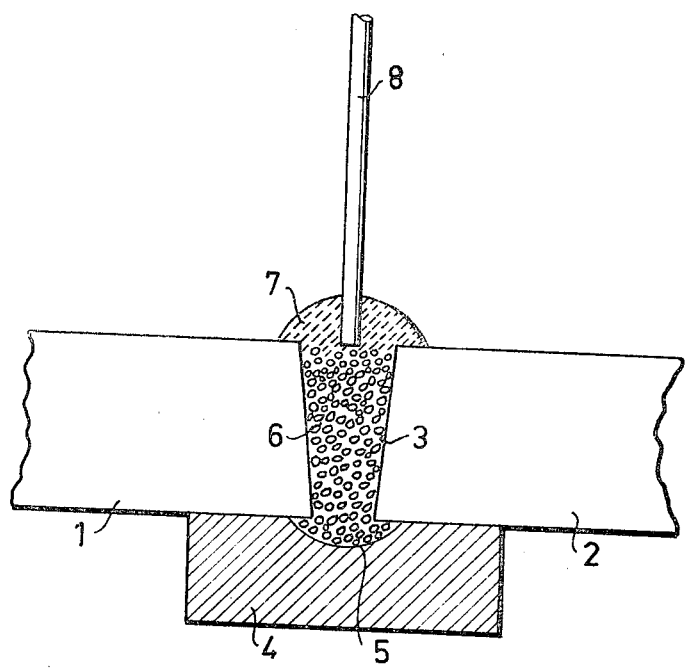

3,511,646
FILLER METAL FOR THE ELECTRIC ARC WELDING, AND METHOD FOR ITS MANUFACTURE
Henry Gert von Scheele and Anders Eric Bengtsson, Hoganas, Sweden, assignors to Hoganas-Billesholms Aktiebolag, Hoganas, Sweden, a company of Sweden
Filed May 16, 1966, Ser. No. 550,254
Claims priority, application Sweden, June 24, 1965, 8,433/65
Int. Cl. C22c 39/30; B22f 9/00; B23k 35/30
U.S. Cl. 75—123                                    1 Claim

ABSTRACT OF THE DISCLOSURE

For carrying out a "submerged arc" electrical welding procedure, use is made of discrete rounded, compact highly dense particles of carbon-containing alloyed iron powder having a particle size of 0.5–5.0 mm. The iron powder contains at least one alloying agent having deoxidizing properties. It preferably contains 0.01–0.20% by weight of carbon, together with 0.3–5.0% by weight of manganese.

---

The invention is concerned with the submerged arc welding process, that is an electric arc welding process in which the end of the electrode is submerged into a pulverulent flux material, which forms a slag and protects the welding zone. More particularly the invention is concerned with a filler metal for said submerged arc welding process, that is a metal which melts during the welding process, thus forming the weld material, either alone or in combination with molten material originating from the electrode.

Hot-rolled and cold-drawn wire has been used as filler in the automatic submerged arc welding process, in combination with various types of flux. It is a characteristic of the filler wire that it has a manganese content of 0.30–3.20%, a carbon content of 0.06–0.17% and a silicon content of 0.15–0.30%. Molybdenum is added in a certain quantity as an alloying element. The wire is made in dimensions of 1.2–12 mm, according to information given in "Die Unterpulver-Schweissung, Thorie und Praxis," by Werner Schwarz, Oerlikon Elektrodenfabrik Eisenberg GmbH.

It is a problem in the submerged arc welding process that the weld metal and the zone close to the weld, the so-called superheated zone, often has a poor impact strength. This has in some cases reduced the use of the process. This is particularly true when making the entire weld in one single run, and when using a high weld current. For said reasons the filler metal and the sheet metal has to be chosen carefully. It has often been necessary to weld in several runs while using a comparatively low current in order to ensure a high impact strength, and this has resulted in a comparatively expensive welding process.

In recent years it has been suggested to use cut wire in combination with drawn wire and flux, according to an investigation by Kan Okada, Shoichi Saruwatari, Motoi Tokura, and Tishio Miura, published in IIW Document No. XII–219–65. According to said document the application of cut wire in the weld groove has resulted in a considerable increase in welding speed, and the number of welding runs required for filling a predetermined volume may be reduced. Simultaneously, the impact strength of the weld metal and the superheated base metal has been improved. This is probably due to the fact that the melting of the cut wire absorbs a large portion of the supplied heat. This absorption of heat results in a slower growth of the primary crystals and the dendritic crystals, and also reduces the melting of the base material.

Because of the particular requirements for a filler metal for welding only a high quantity wire can be used as raw material for the cut wire. The cut wire used in the experiments described in said IIW document had a length of 0.8–1.6 mm. and a manganese content of 1–1.50%. Cut wire has not yet reached an extensive use as filler material, mainly owing to its high price. If the cut wire contains alloying elements problems arise in varying the quantity and the quality of said alloying elements as desired.

According to the present invention it has been found that a new filler material can be used while improving the technical advantages of the cut wire. The new filler material is much less expensive than the cut wire, its price amounting only to ¼–½ of that of the cut wire. It can easily be manufactured with various contents of alloying elements of various types. It has a good flow, and can, consequently, be fed in an absolutely even stream.

The new filler material consists of rounded, compact iron particles having a size of 0.5–5 mm., preferably 0.5–3 mm. The iron particles have a high density, which is evident from the fact that the volume weight of the powder is comparatively high in spite of the narrow particle size range.

The filler material should preferably contain one or more alloying elements—particularly comparatively high contents of carbon and manganese, viz. 0.01–0.20% carbon and 0.30–5% manganese. When welding alloyed materials it is desired that the filler material should also contain other alloying elements, to improve the quality of the filler material or to act as deoxidizing agents. Such elements are magnesium, silicon, chromium, nickel, molybdenum, aluminum, titanium, and vanadium, which can be incorporated into the filler material with a high accuracy. The quantities of said elements are dependent on the material to be welded.

The use of the filler material of the invention results in a high increase of the welding speed, compared to welding while using drawn wire. It is possible to reduce the number of welding runs required for filling a predetermined weld volume. The invention also results in an increased quality of the weld material and the surrounding base metal, which is due to the fact that the release of gases from the molten metal is facilitated. The release of gases is particularly rapid when using a filler material having a particle size of 1–3 mm. There is also another reason why the particle size should preferably amount to approximately 3 mm., viz. the fact that the metal sheets to be welded are not always situated close to each other. There may be a gap of 1–2 mm. Fine particles will fall through such a gap. As compared to the conventional submerged arc welding process the invention makes it possible to prepare the edges of the metal sheets to be welded in a much simpler way, as not requiring such an accurate gap between the sheets.

The invention is also concerned with the submerged arc welding process comprising arranging two objects to be welded so as to form a gap between them, supplying a solid filler metal in said gap, covering the solid filler metal with a pulverulent flux material, arranging an electrode to dip into the pulverulent flux material, and providing electric current to form an electric arc so as to melt the filler metal. The improvement according to the invention consists in the solid filler metal being a carbon-containing iron powder having a particle size of 0.5–5 mm. and containing at least one alloying agent having deoxidizing and quality-improving characteristics. This method will be described with reference to the accompanying drawing.

The drawing illustrates two metal sheets 1 and 2 having end surfaces 3 defining a V-shaped groove between them. The bottom of the groove is formed by a recessed portion 5 of a copper rod 4. A pulverulent filler metal 6 according to the invention is supplied to the groove up to the level defined by the upper surfaces of the metal sheets. A pulverulent flux material 7 is supplied to cover the filler material 6. The nature of the flux material is well known to a person skilled in the submerged welding technique. For instance, when welding unalloyed steel the flux material may contain 33% by weight $SiO_2$, 28% MnO, 7% CaO, 5% $CaF_2$, 2% MgO, and 20% $Al_2O_3$. An electrode 8 is mounted to have its lower end situated approximately at the upper surface of the filler material 6. Electric current is supplied to form an arc between the electrode and the metal sheets. A pool of molten metal is formed between the metal sheets, said pool consisting of filler metal and metal originating from the electrode. The pool is protected by the flux material 7 from being oxidized. The pool is allowed to cool, and the copper rod 4 and the slag formed by the flux material is finally removed.

The invention also relates to a method for the manufacture of said filler materials.

It is possible to manufacture a pulverulent material by atomizing a molten metal. However, when particles larger than 0.5 mm. are desired the so-called popcorn effect occurs. A large portion of the powder particles become porous, resulting in an uneven product having too low a density. Additionally, it is difficult to maintain a constant composition when manganese, silicon, chromium, for instance, are present, said elements being easily oxidizable.

The method of the present invention results in a product which does not suffer from the inconveniences mentioned above. The product has a high and even density and can be manufactured in a large quantity with the desired composition.

The method starts from an iron powder having fine particles. A coarser alloyed powder is made from said fine-grained powder. The desired metals or metal alloys are thoroughly admixed as a very fine powder with the iron powder, to give the desired composition to the powder mixture. The powder mixture is compressed by being rolled to form a strip having a thickness of 1-3 mm. The object of the rolling process is to compress the powder mixture to give it the highest density possible, and to fix the alloying agent to the iron powder. The rolled strip is disintegrated to form pieces having a size of 5-15 mm. Said pieces are now annealed at approximately 1000° C. for 15-120 minutes in a gaseous atmosphere which is controlled to give an annealed material having the desired carbon content, which can be varied between 0.01 and 0.20%, as desired. The gas may preferably consist of a mixture of carbon monoxide and carbon dioxide, the percentage of carbon monoxide being varied to give the desired carbon content to the annealed material. The annealing process has four objects:

(1) To reduce residual oxides, if any, into metals.
(2) To homogenize the pulverulent alloying agents by making them diffuse into the iron particles.
(3) To adjust the carbon content to the desired value of 0.01-0.20%.
(4) To increase the malleability of the material and to firmly bind the particles to each other, for making it possible to produce coarse particles.

The annealed material is now pulverized in any suitable mill. If desired, the powder is sieved to give the desired particle size, for instance 1-3 mm. The material is now ready to be used.

The pulverization and the sieving of the annealed powder has three other objects, viz:

(1) To compress the powder particles for substantially eliminating their porosity so as to obtain a high density.
(2) To forge the particles for giving them a spherical or rounded shape.
(3) To divide the material in desired particle size ranges, the major quantity of the powder being within a comparatively narrow particle size range, for instance 1-3 mm.

Of course some fine powder is also produced, falling outside the desired particle size range. If desired, the fine powder can be returned to the manufacturing process by being admixed with the powder mixture before the rolling process.

It is possible to sieve the powder in such a way that the finished powder contains particles of various sizes in such quantities as to produce the highest density possible. If the highest density is to be obtained when using cut wire, a series of wires having various thicknesses must be used.

The manufacture of filler metal as described above involves many technical advantages as compared to the manufacture of cut wire, including a considerably lower cost. The method of the invention is also advantageous as compared to the direct manufacture of an alloyed iron powder by atomization. The fine iron powder used as starting material can be alloyed with other metals or metal alloys with a high degree of accuracy. The alloying metal or metals is added as a very fine-grained powder which is uniformly distributed in the powder mixture. The calculated addition of alloying elements produces exactly the desired composition. The use of sponge iron as raw material is advantageous as compared to many other raw materials, as sponge iron consists of pure iron and is of an even quality. The composition of the resulting powder mixture need not be checked, as the iron powder and the alloying elements have an exactly known composition. The mixing of metal powders without melting provides a more "flexible" process than does a melting process, as the composition can be rapidly changed to be adapted to the current requirements.

EXAMPLE

Sponge iron was milled to a powder having a particle size less than 0.150 mm. 100 kg. of this powder was thoroughly mixed with 2 kg. ferro-manganese powder which had a considerably smaller particle size than the iron powder, viz. less than 0.040 mm. The powder was rolled to form a strip in a conventional rolling mill. The strip had a thickness of 1.6 mm. The strip was disintegrated in a mill having toothed rolls to form pieces having a size of 5–15 mm.

The material thus produced was annealed for one hour in a belt conveyor furnace containing a protective gas having a composition producing a carbon content of 0.10% in the material leaving the furnace.

The annealed product was pulverized in a mill in which the pulverizing tool consisted of a slowly rotating cone having a grooved surface. The mill having been correctly adjusted it pulverized the material to the desired particle size without the formation of too many fine particles. The milling also resulted in a forging effect producing rounded and dense particles.

The powder was now sieved through sieves Nos. 7 and 18 according to the ASTM standard. The coarse fraction, which did not pass through No. 7 (7 mesh per inch) was returned to the mill for another pulverizing process. The fine fraction, passing through sieve No. 18, was returned to the process to be admixed with the powder mixture before said mixture was rolled into a strip.

The powder fraction passing through sieve No. 7 but not through sieve No. 18 had a particle size of 1–3 mm. and a density of 2.81 g./cm.$^3$. This fraction was now ready for use.

What is claimed is:
1. A filler material for the submerged arc welding process consisting of discrete, rounded, compact, dense particles, having a particle size within the range 0.5–5.0 mm., of alloyed iron containing from 0.01 to 0.20 weight percent of carbon and from 0.3 to 5.0 weight percent of manganese and a significant amount of an additional alloying constituent having deoxidizing and quality- improving characteristics, said alloying constituent being selected from the group consisting of magnesium, silicon, chromium, nickel, molybdenum, aluminum, titanium and vanadium.

References Cited

UNITED STATES PATENTS

| | | | |
|---|---|---|---|
| 1,595,143 | 8/1926 | Doan | 75—123 |
| 2,621,278 | 12/1952 | Muller | 75—123 |
| 2,876,151 | 3/1959 | Helin et al. | 148—26 |

L. DEWAYNE RUTLEDGE, Primary Examiner

W. W. STALLARD, Assistant Examiner

U.S. Cl. X.R.

29—194; 75—0.5; 219—137